United States Patent [19]

Mitsui

[11] Patent Number: 5,355,236

[45] Date of Patent: Oct. 11, 1994

[54] METHOD OF INJECTING FERROELECTRIC LIQUID CRYSTAL INCLUDING MULTIPLE PRESSURE CHANGES

[75] Inventor: Mutsuo Mitsui, Hachiohji, Japan

[73] Assignee: Canon Kabushiki Kaisha, Tokyo, Japan

[21] Appl. No.: 56,896

[22] Filed: May 5, 1993

[30] Foreign Application Priority Data

May 11, 1992 [JP] Japan ................................ 4-143715

[51] Int. Cl.⁵ .......................................... G02F 1/1339
[52] U.S. Cl. ......................................... 359/62; 359/80
[58] Field of Search .................................. 359/62, 80

[56] References Cited

U.S. PATENT DOCUMENTS

| | | | |
|---|---|---|---|
| 4,691,995 | 9/1987 | Yamazaki et al. | 359/80 |
| 5,024,255 | 6/1991 | Watanabe et al. | 141/11 |
| 5,285,300 | 2/1994 | Suzuki et al. | 359/54 |

FOREIGN PATENT DOCUMENTS

| | | | |
|---|---|---|---|
| 0312028 | 4/1989 | European Pat. Off. | 359/62 |
| 1-31118 | 2/1989 | Japan | 359/80 |

OTHER PUBLICATIONS

Patent Abstracts of Japan, vol. 12, No. 220 63-015,218 (Jun. 23, 1988) (P-720).
Patent Abstracts of Japan, vol. 12, No. 104 62-273,422 (Apr. 6, 1988) (P-685).
Patent Abstracts of Japan, vol. 17, No. 143 4-316,021 (Mar. 23, 1993) (P-1507).

Primary Examiner—William L. Sikes
Assistant Examiner—Ron Trice
Attorney, Agent, or Firm—Fitzpatrick, Cella, Harper & Scinto

[57] ABSTRACT

A ferroelectric liquid crystal is injected into a liquid crystal cell including a pair of substrates each having at least an electrode thereon and disposed with a sealing agent therebetween so as to provide a prescribed gap therein. The liquid crystal is injected while (a) changing a pressure or a pressure and a temperature of an environment of the liquid crystal cell with time so that (i) in an initial stage of injection, the liquid crystal is injected at a suppressed speed, and (ii) in an intermediate stage of injection, the liquid crystal is injected at a controlled speed so that a front end of the liquid crystal injected within the cell progresses at a substantially constant speed, (b) in a final stage of injection, cooling the liquid crystal under a pressure so as to avoid occurrence of a local liquid crystal injection failure due to a difference in thermal expansion coefficient between the liquid crystal and the substrates, and (c) during the pressure-changing step with time, introducing an inert gas into the environment so as to increase the environmental pressure to a pressure exceeding a normal pressure (760 Torr).

5 Claims, 1 Drawing Sheet

METHOD OF INJECTING FERROELECTRIC LIQUID CRYSTAL INCLUDING MULTIPLE PRESSURE CHANGES

FIELD OF THE INVENTION AND RELATED ART

The present invention relates to a method of injecting a ferroelectric liquid crystal into a liquid crystal cell in a process for producing a liquid crystal display device.

Hitherto, the injection of a liquid crystal into a liquid crystal cell has been performed by attaching a liquid crystal material generally heated at a prescribed temperature so as to provide a lowered viscosity to an injection port of a blank cell which has been evacuated under vacuum to a reduced pressure of about $10^{-2}$ Torr, and restoring the environment of the cell to the atmospheric pressure.

Further, along with the enlargement of cell size, it has been also practiced to inject the liquid crystal under a prescribed pressure (e.g., 1540 Torr) above the atmospheric pressure so as to shorten the injection time.

However, in the conventional liquid crystal injection method effected under a constant temperature and a constant pressure, the resistance acting on the liquid crystal moving within the blank cell exerted by the inner surface (alignment film surface) of the cell differs depending on the distance of the liquid crystal moving front from the injection port. For this reason, particularly in a ferroelectric liquid crystal cell having a cell gap (on the order of 1 $\mu$m) which is smaller than that of a twisted nematic liquid crystal, the liquid crystal moving speed within the cell during the liquid crystal injection varies so that the following problems have arisen:

(1) a local difference in alignment state occurs due to the difference in liquid crystal moving speed, thus being liable to fail in providing a uniform display quality over the entire area, and (2) a local injection failure is liable to be caused due to abrupt liquid crystal movement from the initial stage of injection.

Further, when the ferroelectric liquid crystal heated under a reduced pressure contacts the air introduced in the liquid crystal injection step, the ferroelectric liquid crystal is liable to be oxidized to become yellowish.

SUMMARY OF THE INVENTION

In view of the above-mentioned problems of the prior art, an object of the present invention is to provide a method of injecting a ferroelectric liquid crystal capable of an image display area of a uniformly high quality and free from local injection failure over the entire cell area.

According to the present invention, there is provided a method of injecting a ferroelectric liquid crystal into a liquid crystal cell comprising a pair of substrates each having at least an electrode thereon and disposed with a sealing agent therebetween so as to provide a prescribed gap therebetween, the method comprising:

(a) changing a pressure or a pressure and a temperature of an environment of the liquid crystal cell with time so that, in an initial stage of injection, the liquid crystal is injected at a suppressed speed, and in an intermediate stage of injection, the liquid crystal is injected at a controlled speed so that a front end of the liquid crystal injected within the cell progresses at a substantially constant speed, (b) in a final stage of injection, cooling the liquid crystal under a pressure so as to avoid re-occurrence of a local liquid crystal injection failure due to a difference in thermal expansion coefficient between the liquid crystal and the substrates, and (c) during the pressure-changing step with time, introducing an inert gas into the environment so as to increase the environmental pressure to a pressure exceeding a normal pressure (760 Torr). As a result, it is possible to prevent the occurrence of a local injection failure, such as an injection lack of liquid crystal, and provide a liquid crystal display device with a uniform alignment state over the entire display area, thus providing a uniform and high-quality display.

These and other objects, features and advantages of the present invention will become more apparent upon a consideration of the following description of the preferred embodiments of the present invention taken in conjunction with the accompanying drawing.

DESCRIPTION OF THE PREFERRED EMBODIMENTS

Hereinbelow, the present invention is described more specifically based on an example.

Figure 1:
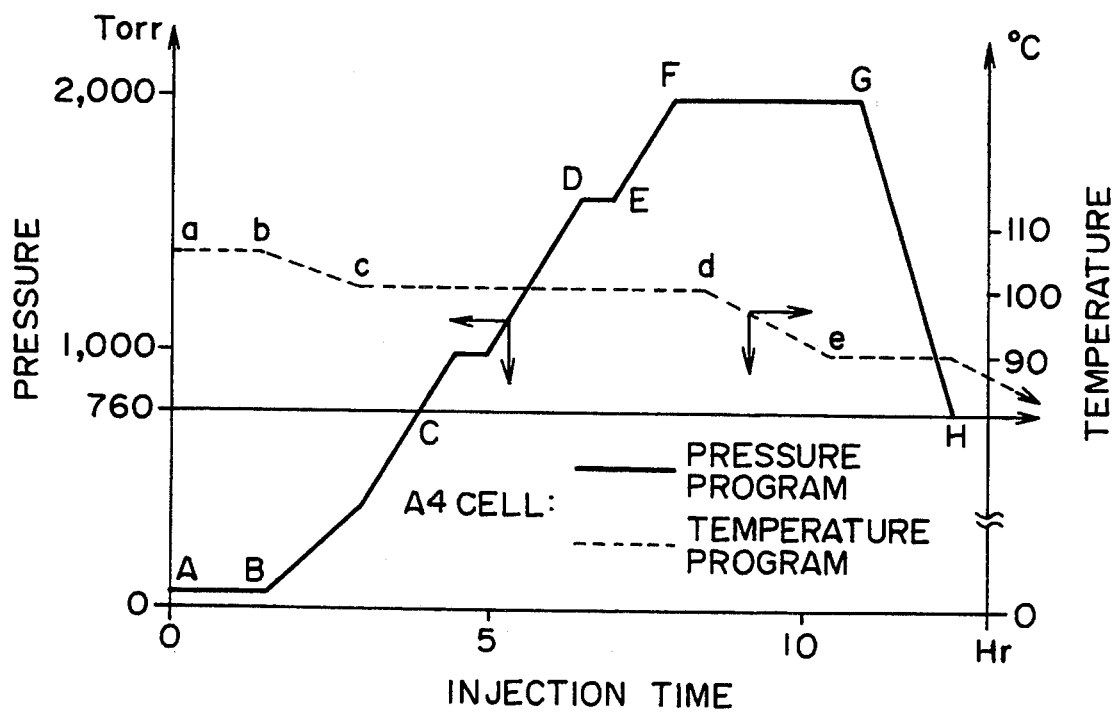
FIG. 1 is a graph showing an example of programmed change in pressure and temperature with time according to the invention.

FIG. 1 is a graph showing an example of programmed change in pressure and temperature of liquid crystal cell environment with time according to the invention, more specifically a temperature-changing program (diagram) and a pressure changing program (diagram) provided to a temperature timer and a pressure timer set in an injection apparatus for injection of a ferroelectric liquid crystal into an A4-size cell.

The injection steps are described with reference to FIG. 1. First of all, in the initial stage of injection (e.g., up to about 10 cm intrusion of the liquid crystal material), in order to prevent the occurrence of a local injection failure liable to occur around the injection port due to abrupt progress of liquid crystal, the injection is effected principally by heating under vacuum at a pressure of about $10^{-2}$ Torr so as to suppress the progress of the liquid crystal (A-B on pressure program, a-b on temperature program).

In an intermediate stage of injection (e.g., between the about 10 cm intrusion and nearly full injection of the liquid crystal material, the pressure is gradually increased so as to provide an almost constant progressing speed of the liquid crystal by compensating for the decrease in progressing speed of liquid crystal caused along with an increased degree of liquid crystal injection (B-F on pressure program). In the course of the pressure increase (C-F on pressure program), the pressure is held at constant values for prescribed periods, so as to effect a compensation between the pressure increase on the program and the change in pressure actually applied to the liquid crystal in view of the following two factors. That is, the pressure actually applied to the liquid crystal cannot exactly follow the pressure increase on the program because of the viscosity of the liquid crystal but the actual pressure increase is smaller than that on the program; and even if a constant pressure period is provided on the pressure program, the pressure actually applied to the liquid crystal can increase due to a kind of inertia without stop following the program. The pressure increase over the normal pressure (along the path C-F on pressure program) is effected by introducing an inert gas such as $N_2$, into an environment or chamber in which the cell is placed.

Up to the medium stage, the liquid crystal material within and around the cell may preferably be held at a constant temperature. For accomplishing this, it is preferred to set the environmental temperature slightly higher at the initial stage and somewhat lower the environmental temperature during the medium stage in view of the increase in heat capacity of environment due to an increase in environmental pressure as observed on a curve a–d on the temperature program shown in FIG. 1.

In the final stage of injection, the temperature is decreased while keeping a pressurized state so as to remove a non-injection part (or local injection failure) due to a difference in thermal expansion coefficient between the cell substrates (usually, glass) and the liquid crystal material (F-G on pressure program, d-e on temperature program). Then, after the completion of liquid crystal injection, the environment is restored to the normal temperature and normal pressure. Thereafter, the injection port is sealed and, after curing of the sealing agent, the cell may be heated to an isotropic or cholesteric phase temperature (of, e.g., around 95° C.) and gradually cooled to a chiral smectic temperature (e.g., about 50° C.) to effect re-alignment of the liquid crystal material in the cell to obtain a ferroelectric liquid crystal cell suitable for driving.

Figure 2:
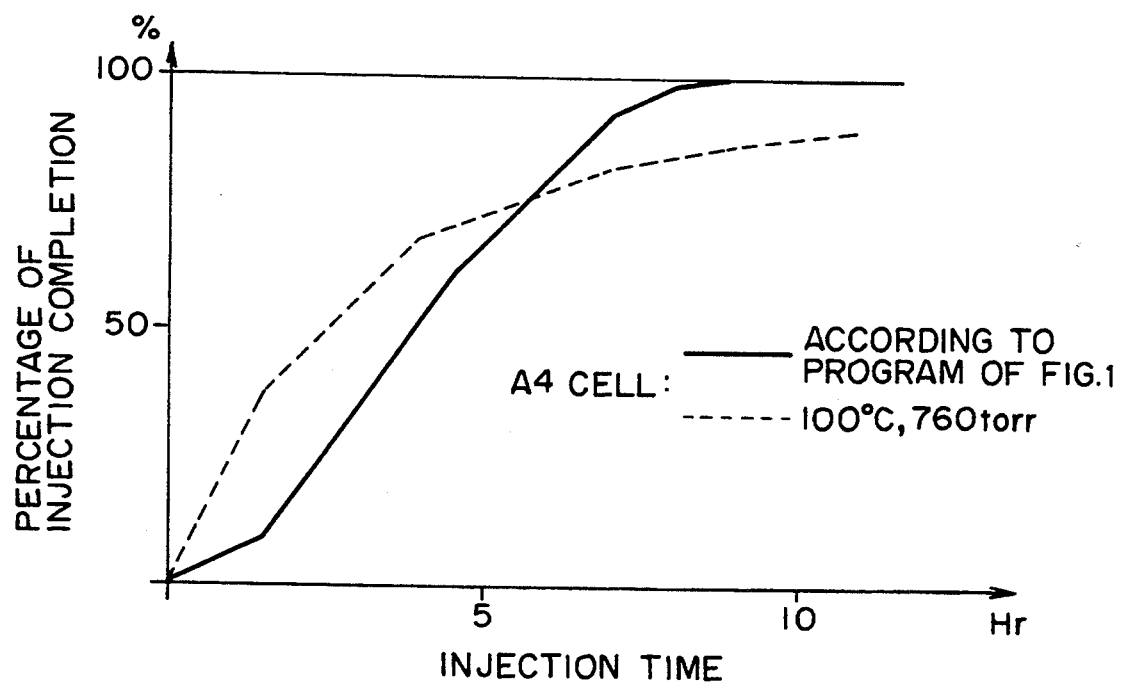
FIG. 2 is a graph showing a relationship between the percentage of injection completion and the injection time according to a method of the invention and a conventional method.

FIG. 2 shows a relationship between the percentage of injection completion and injection time in the case of injection under the liquid crystal cell environmental conditions according to the program shown in FIG. 1 and in the case of conventional method of injection effected at constant temperature and pressure conditions (100° C., 760 Torr). The inclination of each curve in FIG. 2 represents a progress speed of liquid crystal and thus the conventional method of injection effected under constant conditions provides a large progress speed at the initial stage of injection and a gradually slower progress speed along with the progress of injection.

On the other hand, according to the injection method of the present invention, the initial progress speed is suppressed and thereafter the progress speed is kept substantially constant so that the total injection time is substantially shortened.

In a specific example, into a blank cell of A4-size and with a cell gap of 1.5 μm, a pyrimidine-based ferroelectric liquid crystal mixture showing the following phase transition series was injected under the liquid crystal cell-surrounding temperature and pressure conditions according to the program shown in FIG. 1, whereby a display panel having a uniform alignment state over the entire display area was observed.

On the other hand, a display panel obtained by injecting the above pyrimidine-based ferroelectric liquid crystal mixture into an identical blank cell as above under the constant temperature and pressure conditions of 100° C. and 760 Torr was accompanied with an alignment irregularity attributable to a change in progress speed of the liquid crystal material during the course of injection thereof.

In the present invention, the temperature and pressure conditions of the liquid crystal cell environment for injection are not limited to those shown in FIG. 1, but it is also possible to obtain a uniform alignment state by changing only the pressure so as to control the injection speed at a constant temperature.

As described above, according to the present invention, the liquid crystal injection speed is controlled by changing the pressure or the pressure and temperature at the time of liquid crystal injection, so that the liquid crystal progressing speed in the initial stage of injection is suppressed to avoid a local injection failure liable to occur around the injection port, the liquid crystal progressing speed in the medium stage of injection is made substantially constant to provide a uniform alignment state, and the temperature is decreased under pressure in the final stage of injection so as to prevent re-occurrence of a local injection failure liable to be caused due to a difference in thermal expansion coefficient between the substrates and the liquid crystal material. Further, it is also possible to substantially shorten the injection time by applying an increased pressure varying depending on the increase in injection amount of liquid crystal.

What is claimed is:

1. A method of injecting a ferroelectric liquid crystal into a liquid crystal cell comprising a pair of substrates each having at least an electrode thereon and disposed with a sealing agent therebetween so as to provide a prescribed gap therebetween, the method comprising:

(a) changing a pressure or a pressure and a temperature of an environment of the liquid crystal cell with time so that,
    in an initial stage of injection, the liquid crystal is injected at a suppressed speed, and
    in an intermediate stage of injection, the liquid crystal is injected at a controlled speed so that a front end of the liquid crystal injected within the cell progresses at a substantially constant speed, (b) in a final stage of injection, cooling the liquid crystal under a pressure so as to avoid occurrence of a local liquid crystal injection failure due to a difference in thermal expansion coefficient between the liquid crystal and the substrates, and (c) during the pressure-changing step with time, introducing an inert gas into the environment so as to increase the environmental pressure to a pressure exceeding 760 Torr.

2. A method according to claim 1, wherein the pressure in the initial stage of injection is held substantially constant.

3. A method according to claim 1, wherein the pressure in the intermediate stage of injection is generally increased.

4. A method according to claim 3, wherein the pressure is held constant for a prescribed period during the intermediate stage of injection.

5. A method according to claim 1, wherein the pressure is held substantially constant in the final stage of injection.

* * * * *